(12) United States Patent
Murarka et al.

(10) Patent No.: US 12,148,062 B2
(45) Date of Patent: Nov. 19, 2024

(54) GENERATING CONTENT ADAPTIVE WATERMARKS FOR DIGITAL IMAGES

(71) Applicant: Adobe Inc., San Jose, CA (US)

(72) Inventors: Ankur Murarka, Bangalore (IN); Padmassri Chandrashekar, Bangalore (IN); Subham Gupta, Roorkee (IN)

(73) Assignee: Adobe Inc., San Jose, CA (US)

( * ) Notice: Subject to any disclaimer, the term of this patent is extended or adjusted under 35 U.S.C. 154(b) by 350 days.

(21) Appl. No.: 17/804,503

(22) Filed: May 27, 2022

(65) Prior Publication Data

US 2023/0385980 A1    Nov. 30, 2023

(51) Int. Cl.
| | |
|---|---|
| G06T 1/00 | (2006.01) |
| G06T 7/11 | (2017.01) |
| G06T 7/90 | (2017.01) |
| G06V 30/14 | (2022.01) |
| G06V 30/18 | (2022.01) |

(52) U.S. Cl.
CPC ............ *G06T 1/005* (2013.01); *G06T 1/0028* (2013.01); *G06T 7/11* (2017.01); *G06T 7/90* (2017.01); *G06V 30/1448* (2022.01); *G06V 30/1456* (2022.01); *G06V 30/18105* (2022.01); *G06T 2201/0065* (2013.01); *G06T 2201/0202* (2013.01); *G06T 2207/10024* (2013.01); *G06T 2207/20101* (2013.01)

(58) Field of Classification Search
CPC ......... G06T 1/005; G06T 1/0028; G06T 7/11; G06T 7/90; G06T 2201/0065; G06T 2201/0202; G06T 2207/10024; G06T 2207/20101; G06V 30/1448; G06V 30/1456; G06V 30/18105; G06V 30/10
See application file for complete search history.

(56) References Cited

U.S. PATENT DOCUMENTS 6,707,927 B1 * 3/2004 Kita ..................... G06T 1/0028
                                                           382/232

OTHER PUBLICATIONS w3.org; "G18: Ensuring that a contrast ratio of at least 4.5:1 exists between text (and images of text) and background behind the text"; Date downloaded Jun. 28, 2022; https://www.w3.org/TR/2016/NOTE-WCAG20-TECHS-20161007/G18.
Github; tesseract-ocr/tesseract; Date downloaded Jun. 28, 2022; https://github.com/tesseract-ocr/tesseract.

* cited by examiner

*Primary Examiner* — Christopher Wait
(74) *Attorney, Agent, or Firm* — Keller Preece PLLC

(57) ABSTRACT

The present disclosure relates to systems, non-transitory computer-readable media, and methods for generating marked digital images with content adaptive watermarks. In particular, in one or more embodiments, the disclosed systems intelligently evaluate a plurality of watermark configurations to select one or more content adaptive watermarks for one or more target digital images and generate one or more marked digital images by adding the selected content adaptive watermarks to the one or more target digital images.

20 Claims, 13 Drawing Sheets

GENERATING CONTENT ADAPTIVE WATERMARKS FOR DIGITAL IMAGES

BACKGROUND

Recent years have seen significant improvements in hardware and software for digital image processing and editing. For example, conventional systems allow client devices to insert watermarks into digital content to indicate authorship and/or ownership of the digital content. To illustrate, conventional systems allow client devices to select or upload a watermark image and position the watermark based on user input within one or more digital images prior to exporting the digital images for distribution across computer networks. Although conventional systems can insert watermarks into digital images, such systems have a number of problems in relation to accuracy, efficiency, and flexibility of operation.

BRIEF SUMMARY

Embodiments of the present disclosure provide benefits and/or solve one or more of the foregoing or other problems in the art with systems, non-transitory computer-readable media, and methods for intelligently generating marked digital images with content adaptive watermarks. For example, the disclosed systems analyze the effectiveness of a watermark for various possible watermark configurations. Moreover, embodiments of the present disclosure intelligently determine watermark effectiveness scores to dynamically suggest one or more watermark configurations for a target digital image, such as a watermark position and/or watermark color that exhibits increased visibility of the watermark within the digital image. Further, embodiments of the present disclosure analyze watermark configurations for multiple target digital images and generate multiple marked digital images having content adaptive watermarks in varying configurations.

In one or more implementations, the disclosed systems utilize various methods to intelligently evaluate placement of a watermark at various positions within a digital image to accurately and efficiently generate marked digital images with content adaptive watermarks. Moreover, the disclosed systems adaptively and flexibly determine watermark configurations for a variety of digital images based on user selections and preferences, thus improving efficiency of image processing while accurately producing and positioning content adaptive watermarks within digital images.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
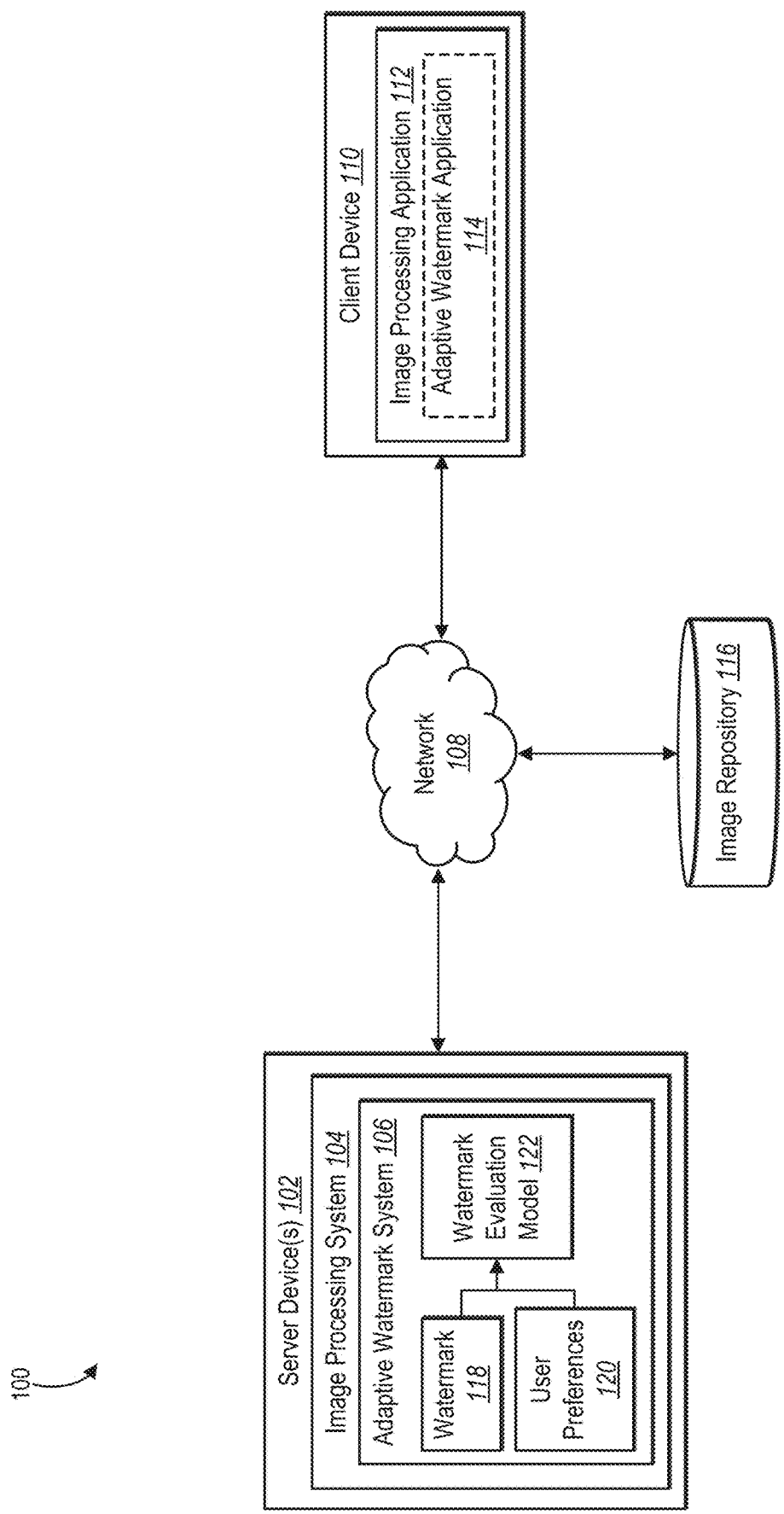
FIG. 1 illustrates a diagram of an environment in which an adaptive watermark system can operate in accordance with one or more embodiments.

This disclosure describes one or more embodiments of an adaptive watermark system that generates marked digital images with content adaptive watermarks. In particular, in one or more embodiments, the adaptive watermark system intelligently evaluates various watermark configurations or attributes relative a target digital image to determine a content adaptive watermark for placement within the target digital image. Furthermore, embodiments of the adaptive watermark system are operable to select and/or generate content adaptive watermarks for multiple digital images. To illustrate, embodiments of the adaptive watermark system determine a watermark effectiveness score for a plurality of watermark configurations and selects a watermark configuration based on the watermark effectiveness scores to determine a content adaptive watermark.

To further illustrate, in one or more embodiments, the adaptive watermark system determines, for a target watermark, a plurality of watermark effectiveness scores corresponding to placement of the target watermark at a plurality of anchor points of a target digital image. The adaptive watermark system selects an anchor point for placement of the target watermark from the plurality of watermarks based on the plurality of watermark effectiveness scores, then generates a marked digital image by adding the target watermark to the target digital image at the selected anchor point.

As mentioned above, in one or more embodiments, the adaptive watermark system generates multiple marked digital images with adaptive watermarks based on a user selection and/or preference. For example, in some embodiments, the adaptive watermark system receives, via a client device, a user selection of a first target digital image, a second target digital image, and a target watermark. The adaptive watermark system determines, for the first and second target digital images, respective first and second pluralities of watermark effectiveness scores corresponding to placement of the target watermark at anchor points of the first and second target digital images. Then, based on the first and second pluralities of watermark effectiveness scores, the adaptive watermark system generates a plurality of marked digital images by adding the target watermark to a first anchor point of the first target digital image and a second anchor point of the second target digital image.

Furthermore, in one or more embodiments, the adaptive watermark system determines watermark effectiveness scores for multiple watermark configurations at least in part by determining an overlap score for each watermark configuration. For example, in some embodiments, the adaptive watermark system generates an overlap score by determining a measure of overlap between one or more objects portrayed within a target digital image and a target watermark when placed at a given anchor point within the target digital image. Then, in accordance with a user preference for watermark overlap with objects of the target digital image, the adaptive watermark system determines a watermark effectiveness score for use in selection of a content adaptive watermark for the target digital image.

Also, in one or more embodiments, the adaptive watermark system determines a watermark effectiveness score for a given watermark configuration by evaluating the relative clarity of the watermark configuration with respect to the target digital image. For instance, in some embodiments, the adaptive watermark system considers placement of a target watermark at a plurality of anchor points within a target digital image by determining contrast ratios between the target watermark and one or more colors of the target digital image at the plurality of anchor points. Moreover, in some embodiments, the adaptive watermark system considers a plurality of candidate watermark colors for a target watermark by comparing contrast ratios between the plurality of candidate watermarks and one or more colors of the target digital image.

As mentioned above, conventional systems suffer from a number of technical deficiencies with regard to accuracy, efficiency, and flexibility of implementing computing devices. Specifically, conventional systems often require a client device to determine watermark configuration for digital images on an individual basis based on repetitive user interactions with various user interfaces. For example, to apply watermarks to a repository of one-hundred digital images, conventional systems require client devices to provide user interfaces and receive individualized user interactions via the user interfaces for each of the one-hundred digital images. This approach requires excessive user interactions, user interfaces and a corresponding excess utilization of computing resources (e.g., processing power and memory). Accordingly, conventional systems inefficiently utilize time and computational resources of implementing devices.

To account for the inefficiency of user-directed watermark selection and placement, some conventional systems allow a user to select a single watermark configuration (e.g., watermark color, size, and relative position) for a batch of digital images. However, implementing watermarks in one configuration across multiple images is often inaccurate. For example, large-scale implementation of a watermark without regard to the contents of digital images results in placement of watermarks that are not visible (e.g., blend into the background) or in inaccurate positions relative to the main subject of the digital image. Thus, for example, utilizing a single configuration approach will cover the main subject/object in some digital images and leave the main subject/object uncovered in other digital images.

In contrast, by intelligently evaluating a plurality of watermark configurations to select a content adaptive watermark for a target digital image, embodiments of the adaptive watermark system improve accuracy, efficiency, and flexibility relative to conventional systems. For instance, the adaptive watermark system improves accuracy of watermark configurations across multiple digital images by intelligently selecting watermark configurations specific to each digital image to generate marked digital images with content adaptive watermarks. Further, embodiments of the adaptive watermark system efficiently incorporate content adaptive watermarks into digital images in accordance with user selections and preferences, such as selection of a particular watermark or preference for placement of a watermark relative to a subject or region of the digital images. Also, embodiments of the adaptive watermark system flexibly adapt watermark configurations to the content of a variety of digital images without image-specific input from a user.

The adaptive watermark system also improves efficiency relative to conventional systems. Indeed, by automatically determining and applying watermark configurations to target digital images, the adaptive watermark system can avoid computing resources needed in generating user interfaces and processing repetitive user inputs corresponding to conventional systems. Indeed, the adaptive watermark system can significantly reduce the time and resources needed to generate and apply watermarks for a large repository of digital images. The adaptive watermark system provides these and many other advantages and benefits over conventional systems and methods.

Additional detail will now be provided in relation to illustrative figures portraying example embodiments and implementations of a depth refinement system. For example, FIG. 1 illustrates a system 100 (or environment) in which an adaptive watermark system 106 operates in accordance with one or more embodiments. As illustrated, the system 100 includes server device(s) 102, a network 108, a client device 110, and an image repository 116. As further illustrated, the server device(s) 102, the client device 110, and the image repository 116 communicate with one another via the network 108.

As shown in FIG. 1, the server device(s) 102 include an image processing system 104 that further includes the adaptive watermark system 106. In one or more embodiments, the adaptive watermark system 106 generates one or more marked digital images utilizing a watermark evaluation model 122 with input of a watermark 118 and user preferences 120 (as further described below). In some embodiments, the server device(s) include, but is not limited to, a computing device (such as explained below in reference to FIG. 11).

As used herein, the term "watermark" refers to a symbol, logo, text, or pattern that is superimposed onto a digital image. For example, watermarks include superimposed images intended to indicate authorship and/or ownership of a digital image. In some instances, a watermark is implemented to prevent copying of a digital image without permission by adversely overlapping the watermark with content of the digital image. In other instances, a watermark is implemented to denote authorship without adversely affecting the content of the digital image (e.g., to credit the author with a signature or other mark).

In some instances, the adaptive watermark system 106 receives a request to generate one or more marked digital images from the client device 110. For example, the request can include a selection of one or more digital images from the image repository 116 or elsewhere, a watermark 118, and one or more user preferences 120 with respect to configuration of the watermark 118 (e.g., watermark size, color, etc.). In response, the adaptive watermark system 106 determines watermark configurations of the provided watermark 118 for the one or more digital images in accordance with user preferences 120 utilizing watermark evaluation model 122 and generates marked digital images that comprise the one or more digital imaged provided with the watermark 118 inserted in the watermark configuration determined by the watermark evaluation model 122 for each digital image (as further described below).

As mentioned, the adaptive watermark system 106 generates marked digital images by inserting watermarks into source digital images in configurations determined by a watermark evaluation model 122. An image (sometimes referred to as "digital image") refers to a digital symbol, picture, icon, and/or other visual illustration depicting one or more objects. For instance, an image can include a digital file having a visual illustration and/or depiction of one or more persons, objects, scenes, landscapes, or the like. Indeed, in some embodiments, an image includes, but is not limited to, a digital file with the following extensions: JPEG, TIFF, BMP, PNG, RAW, or PDF. In addition, in certain instances, an image includes a digital frame of a digital video (or multiple frames thereof). In particular, in one or more embodiments, an image includes a digital frame within, but not limited to, a digital file with the following extensions: MP4, MOV, WMV, AVI, or AVI.

Furthermore, as shown in FIG. 1, the system 100 includes the client device 110. In some embodiments, the client device 110 includes, but is not limited to, a mobile device (e.g., smartphone, tablet), a laptop computer, a desktop computer, or any other type of computing device, including those explained below in reference to FIG. 11. Although not shown in FIG. 1, some embodiments of client device 110 are operated by a user to perform a variety of functions via an image processing application 112 on client device 110. For example, the client device 110 (through the image processing application 112 and an adaptive watermark application 114) performs functions such as, but not limited to, generating marked digital images with content adaptive watermarks. In addition, in some embodiments, the client device 110 also receives marked digital images from the adaptive watermark system 106.

To access the functionalities of the adaptive watermark system 106 (as described above and in greater detail below), in one or more embodiments, a user interacts with the image processing application 112 on the client device 110. For example, the image processing application 112 includes one or more software applications (e.g., to interact with and/or modify digital images in accordance with one or more embodiments described herein) installed on the client device 110, such as adaptive watermark application 114. In certain instances, the image processing application 112 and/or the adaptive watermark application 114 is hosted on the server device(s) 102. Additionally, when hosted on the server device(s) 102, the image processing application 112 and/or the adaptive watermark application 114 is accessed by the client device 110 through a web browser and/or another online interfacing platform and/or tool.

Although FIG. 1 illustrates the adaptive watermark system 106 being implemented by a particular component and/or device within the system 100 (e.g., the server device(s) 102), in some embodiments the adaptive watermark system 106 is implemented, in whole or part, by other computing devices and/or components in the system 100. For instance, in some embodiments, the adaptive watermark system 106 is implemented on the client device 110 within the adaptive watermark application 114. More specifically, in one or more embodiments, the description of (and acts performed by) the adaptive watermark system 106 are implemented (or performed by) the adaptive watermark application 114 when the client device 110 implements the adaptive watermark system 106. In particular, in some embodiments, the client device 110 (via an implementation of the adaptive watermark application 114) generates marked digital images having watermark 118 inserted according to adaptive watermark configurations based on user preferences 120 using the watermark evaluation model 122.

In some embodiments, the adaptive watermark application 114 includes a web hosting application that allows the client device 110 to interact with content and services hosted on the server device(s) 102. To illustrate, in one or more implementations, the client device 110 accesses a web page or computing application supported by the server device(s) 102. The client device 110 provides input to the server device(s) 102 (e.g., a digital image, a watermark, and/or user preferences for watermark configuration). In response, the adaptive watermark system 106 on the server device(s) 102 performs operations described herein to generate marked digital images having content adaptive watermarks. The server device(s) 102 then provides the output or results of the operations (e.g., one or more marked digital images) to the client device 110.

As further shown in FIG. 1, the system 100 includes the image repository 116. In one or more embodiments, the image repository 116 includes, but is not limited to, a server device, a cloud service computing device, or any other type of computing device (including those explained below with reference to FIG. 11) that stores one or more digital images and/or watermarks. In some embodiments, the adaptive watermark system 106 accesses the image repository 116 to retrieve one or more digital images and/or the watermark 118. For example, the adaptive watermark system 106 utilizes images from the image repository 116 to generated marked digital images having the watermark 118 configured therein according to the user preferences 120 utilizing the watermark evaluation model 122. In some instances, the adaptive watermark system 106 performs the above-mentioned tasks upon receiving a request from the client device 110 to utilize digital images and/or watermarks from the image repository 116.

Additionally, as shown in FIG. 1, the system 100 includes the network 108. As mentioned above, in some instances, the network 108 enables communication between components of the system 100. In certain embodiments, the network 108 includes a suitable network and may communicate using any communication platforms and technologies suitable for transporting data and/or communication signals, examples of which are described with reference to FIG. 11. Furthermore, although FIG. 1 illustrates the server device(s) 102, the client devices 110, and the image repository 116 communicating via the network 108, in certain embodiments, the various components of the system 100 communicate and/or interact via other methods (e.g., the server device(s) 102 and the client device 110 communicating directly).

As discussed above, in one or more embodiments, the adaptive watermark system 106 generates marked digital images having content adaptive watermarks utilizing a watermark evaluation model. For instance, FIG. 2 illustrates the adaptive watermark system 106 generating marked digital images 210 from target digital images 202 utilizing a watermark evaluation model 208 to determine watermark configurations of a watermark 204 in accordance with user preferences 206 (in accordance with one or more embodiments).

Figure 2:
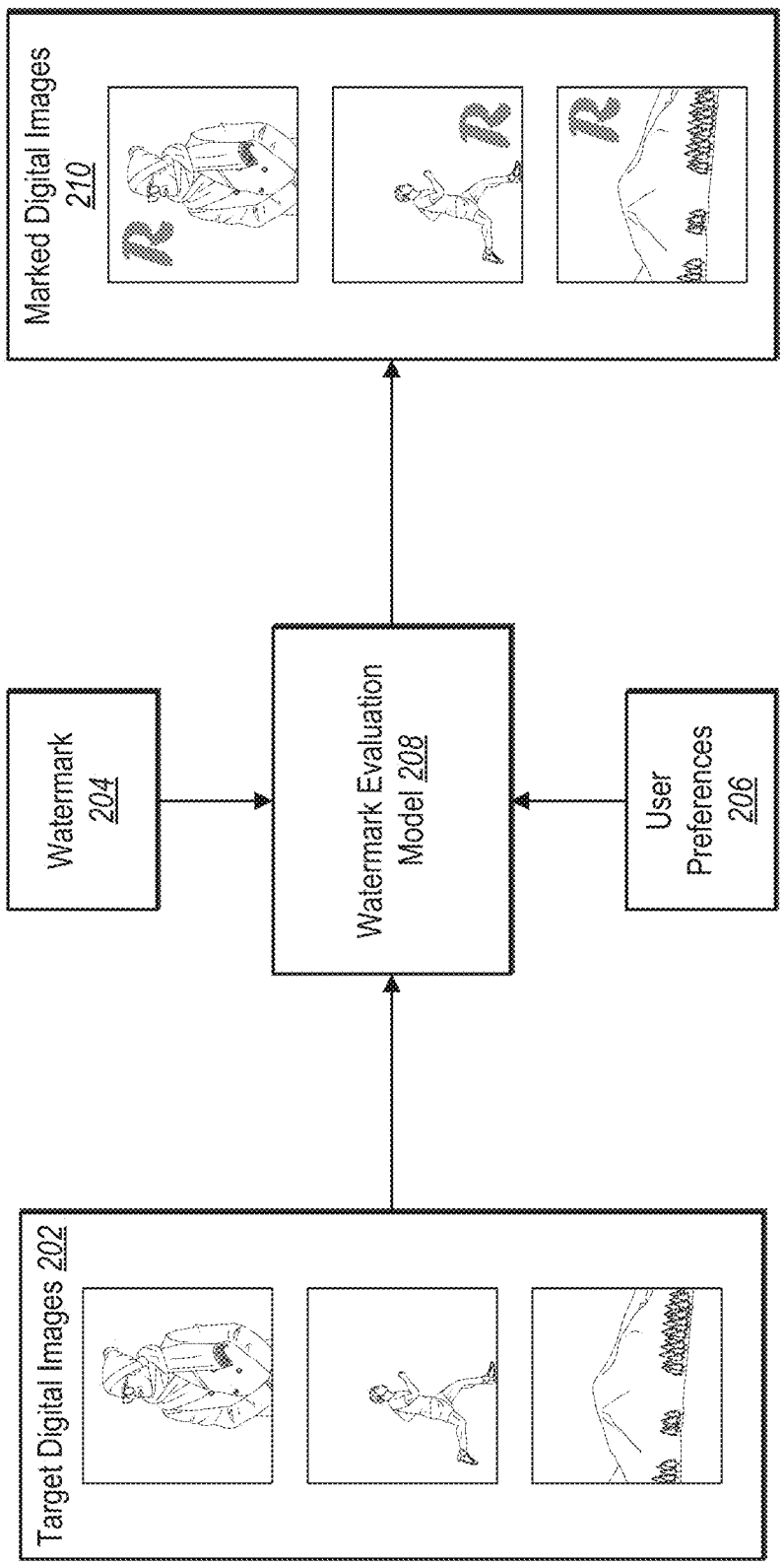
FIG. 2 illustrates an overview of an adaptive watermark system generating marked digital images in accordance with one or more embodiments.

As shown in FIG. 2, the adaptive watermark system 106 identifies (or receives) the target digital images 202 depicting various persons or objects and identifies (or receives) the watermark 204 for application to the target digital images 202 in accordance with the user preferences 206. For example, with regard to the target digital images 202, the adaptive watermark system 106 can access digital images from a local repository (e.g., a camera roll), a camera device, and/or cloud digital image repository. Similarly, the adaptive watermark system 106 can access watermarks from the client device or a remote database that stores one or more potential watermarks. In some implementations, the client device generates a watermark (e.g., utilizing a digital image editing application or text editing application).

Moreover, in one or more implementations, the adaptive watermark system 106 identifies the user preferences 206 based on user input at the client device and/or based on an account stored at a remote server. For instance, as described in additional detail below, in some embodiments, the user preferences 206 include preferences for anchor points (e.g., a number, position, or order of anchor points), for intrusive or non-intrusive watermark placement, for a particular watermark color, and so forth.

As shown in FIG. 2, the adaptive watermark system 106 generates the marked digital images 210 by determining watermark configurations (e.g., selecting anchor points) for each of the target digital images 202 using the watermark evaluation model 208 and inserting the watermark 204 within the target digital images 202 according to the determined watermark configurations. Described in additional detail below (e.g., in relation to FIGS. 3-6), the watermark evaluation model 208 comprises a computer-implemented algorithm for evaluation of various watermark configurations with respect to each digital image, such as watermark placement and color, by determining and comparing watermark effectiveness scores for the various watermark configuration. For example, the watermark evaluation model 208 can include a heuristic algorithm that selects anchor points, colors, and other attributes of a watermark based on watermark effectiveness scores. In the illustrated example, each watermark configuration selected by the watermark evaluation model 208 differs between the marked digital images 210, in that the watermark 204 is placed at a different location within each respective image to avoid overlap with an object of the respective image.

In particular, as shown in FIG. 2, the adaptive watermark system 106 generates marked digital images 210 having content adaptive watermarks. As used herein, "content adaptive watermarks" refers to watermarks positioned within and otherwise configured with respect to content within an image (e.g., such that the content is or is not obscured by the watermark, depending on user preferences). For instance, in some circumstances, image authors may want to avoid obscuring content of images in order to ensure that the watermark does not interfere with the content. Alternatively, in some circumstances, image authors may want to deliberately obscure image content to disincentivize plagiarism or unauthorized procurement of the marked images. To further illustrate, various examples of content adaptive watermarks are discussed below in relation to FIGS. 7 and 8A-8B.

As mentioned above, in one or more embodiments, the adaptive watermark system 106 generates a marked digital image using a watermark evaluation model to determine a watermark configuration in accordance with user preferences. For example, FIG. 3 illustrates the adaptive watermark system 106 generating a marked digital image 320 with watermark 306 positioned and configured within a digital image 302 in accordance with user preferences 304 (in accordance with one or more embodiments).

Figure 3:
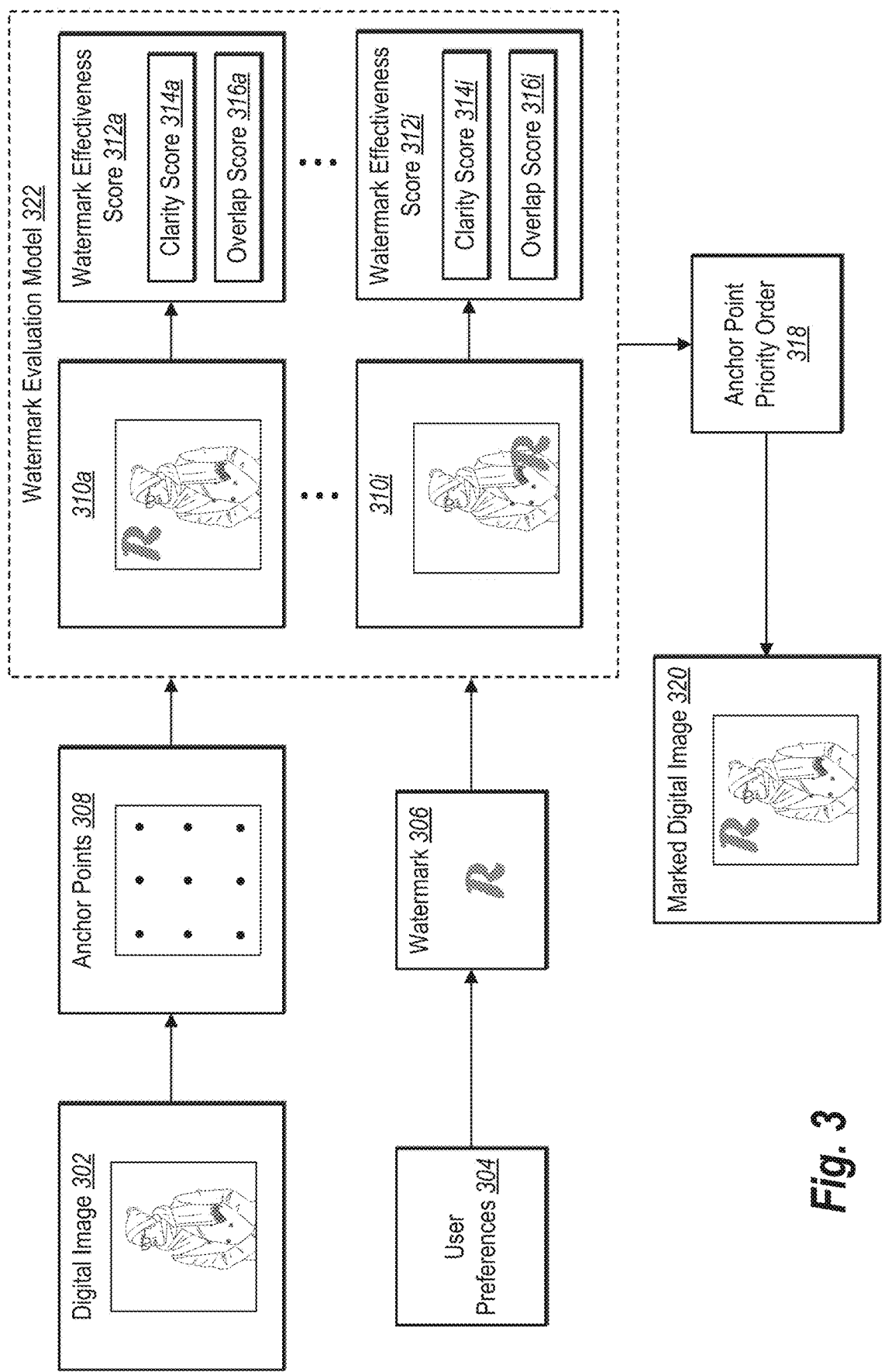
FIG. 3 illustrates an adaptive watermark system determining watermark effectiveness scores for placement of a target watermark at multiple anchor points and generating a marked digital image in accordance with one or more embodiments.

For example, as illustrated in FIG. 3, the adaptive watermark system 106 utilizes a watermark evaluation model 322 to determine watermark effectiveness scores 312a-312i corresponding to placement of the watermark 306 at anchor points 308. As illustrated, the watermark evaluation model 322 determines the watermark effectiveness scores 312a-312i comprising clarity scores 314a-314i (e.g., as described below in relation to FIG. 6) and overlap scores 316a-316i (e.g., as described below in relation to FIG. 5) to evaluate placement of the watermark 306 at each of anchor points 308. As used herein, the term "watermark effectiveness score" refers to a numerical score indicative of the effectiveness or desirability of a given watermark configuration in accordance with a specified hierarchy of evaluation parameters. For example, as further described below, a watermark effectiveness score can include a numerical representation of the overall clarity and/or overlap of a given watermark configuration.

As shown in FIG. 3, the anchor points 308 indicate various positions for placement of the watermark 306 within the digital image 302. For example, as shown, a total of nine anchor points 308 are positioned in the following relative locations of the digital image 302: top-left, top-center, top-right, center-left, center, center-right, bottom-left, bottom-center, and bottom-right. Alternatively, some embodiments include more or less anchor points than indicated in FIG. 3. Indeed, embodiments can include any number of anchor points for consideration by the adaptive watermark system 106 with respect to relative positioning of the watermark 306 within digital image 302.

As shown in FIG. 3, the adaptive watermark system 106 identifies (or receives) the digital image 302, user preferences 304, and watermark 306. In some embodiments, for example, the user preferences 304 include preferences for placement, color, size, and/or other features of the watermark 306. Then, utilizing the watermark evaluation model 322, the adaptive watermark system 106 determines the watermark effectiveness scores 312a-312i for placement of the watermark 306 at each of the anchor points 308. For instance, as illustrated by image 310a, the adaptive watermark system 106 positions the watermark 306 at a top-left anchor point of the anchor points 308 and determines watermark effectiveness score 312a comprising a clarity score 314a and an overlap score 316a. In one or more embodiments, the clarity score 314a represents an evaluation of the visibility (i.e., clarity) of the watermark 306 when positioned as shown in the digital image 310a (discussed in additional detail below in relation to FIG. 6). In addition, in some embodiments, the overlap score 316a represents a measure of overlap between the watermark 306 and a subject (e.g., an object or a person) of the digital image 302 when the watermark 306 is positioned as illustrated by image 310*a* (discussed in additional detail below in relation to FIG. 5).

As further illustrated in FIG. 3, the adaptive watermark system 106 determines watermark effectiveness scores 312*a*-312*i* for placement of the watermark 306 at each of the anchor points 308. Accordingly, the adaptive watermark system 106 performs the acts described above in relation placement of the watermark 306 at each remaining anchor point of the anchor points 308, as illustrated by the images 310*b*-310*i*, to determine watermark effectiveness scores 312*b*-312*i* comprising respective clarity scores 314*b*-314*i* and respective overlap scores 316*b*-316*i*. In response to determining the watermark effectiveness scores 312*a*-312*i* for placement of the watermark 306 at the anchor points 308, the adaptive watermark system 106 selects a watermark placement in accordance with user preferences 304, based on the watermark effectiveness scores 312*a*-312*i*. For example, as shown in FIG. 3, the adaptive watermark system 106 selects the watermark placement indicated in digital image 310*a*. In other words, the adaptive watermark system 106 selects the top left anchor point from the plurality of anchor points 308 upon evaluation of the anchor points 308 by the watermark evaluation model 322. As shown, the placement illustrated by image 310*a* exhibits zero overlap with the subject of digital image 302. In contrast, the watermark placement illustrated by the image 310*i* exhibits at least partial overlap between the watermark 306 and the subject of digital image 302. Accordingly, the adaptive watermark system 106 selects the top left anchor point and generates the marked digital image 320 by adding the watermark 306 at the selected anchor point.

In some instances, user preferences 304 indicate a preference for overlap of the watermark 306 with a subject of the digital image 302. For example, a user may specify a preference for non-intrusive watermark placement, such that overlap of the watermark 306 and the subject(s) of the digital image 302 are avoided to ensure visibility of the subject(s). Alternatively, a user may specify a preference for intrusive watermark placement, such that the watermark 306 is deliberately positioned to overlap with a subject of the digital image 302 (e.g., to discourage or prevent unauthorized use of the digital image 302). In some embodiments, the user's preference with respect to overlap is implemented by weighting the overlap score in favor of or against overlap with the subject(s) of the digital image 302, depending on user preferences 304. Additional and alternative properties of user preferences are described below (e.g., in relation to FIG. 7).

Furthermore, as shown in FIG. 3, in some embodiments, the adaptive watermark system 106 identifies (or receives) an anchor point priority order 318 for further consideration in the selection of watermark placement. For example, the anchor point priority order 318 comprises a ranking (i.e., a preferred ordering) of anchor points 308. Thus, in instances where the adaptive watermark system 106 determines two or more identical watermark effectiveness scores, the anchor point priority order 318 provides additional input for selection of a preferred watermark placement when generating marked digital image 320. In one or more implementations, the adaptive watermark system 106 utilizes the following order of anchor points: Bottom-Right>Bottom-Left>Top-Right>Top-Left>Bottom-Center>Top-Center>Center-Left>Center-Right>Center. The adaptive watermark system 106 can determine this ordering (e.g., based on most commonly used positions or based on user input).

Additionally, while not shown in FIG. 3, in one or more embodiments, the adaptive watermark system 106 evaluates placement of the watermark 306 at the anchor points 308 within a plurality of digital images to select watermark configurations (e.g., to select anchor points for the watermark). In response, the adaptive watermark system 106 generates a plurality of marked digital images having the watermark 306 positioned at one of the anchor points based on respective watermark effectiveness scores corresponding to each image of the plurality of digital images. Accordingly, the adaptive watermark system 106 intelligently positions the watermark 306 on an image by image basis by evaluating placement of the watermark 306 at the anchor points for each image of the plurality of digital images.

As mentioned above, in one or more embodiments, the adaptive watermark system 106 generates marked digital images having content adaptive watermarks by determining and/or evaluating various watermark configurations. For example, FIGS. 4A-4B illustrate the adaptive watermark system 106 determining a selected color 418 for a watermark 402 by determining and/or evaluating a plurality of candidate colors 412.

Figure 4A:
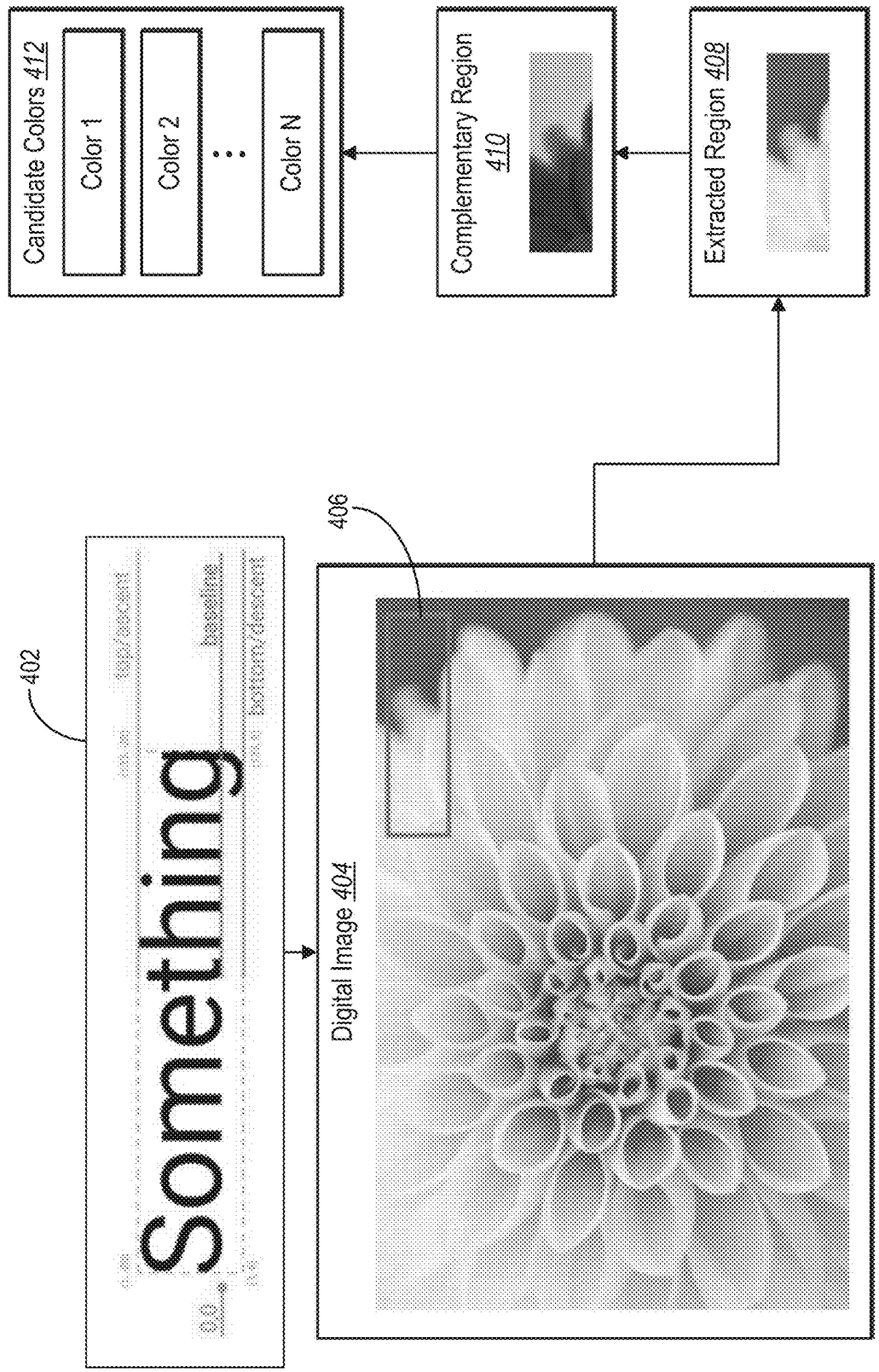
FIG. 4A illustrates an adaptive watermark system determining candidate watermark colors for a target watermark in accordance with one or more embodiments.
Figure 4B:
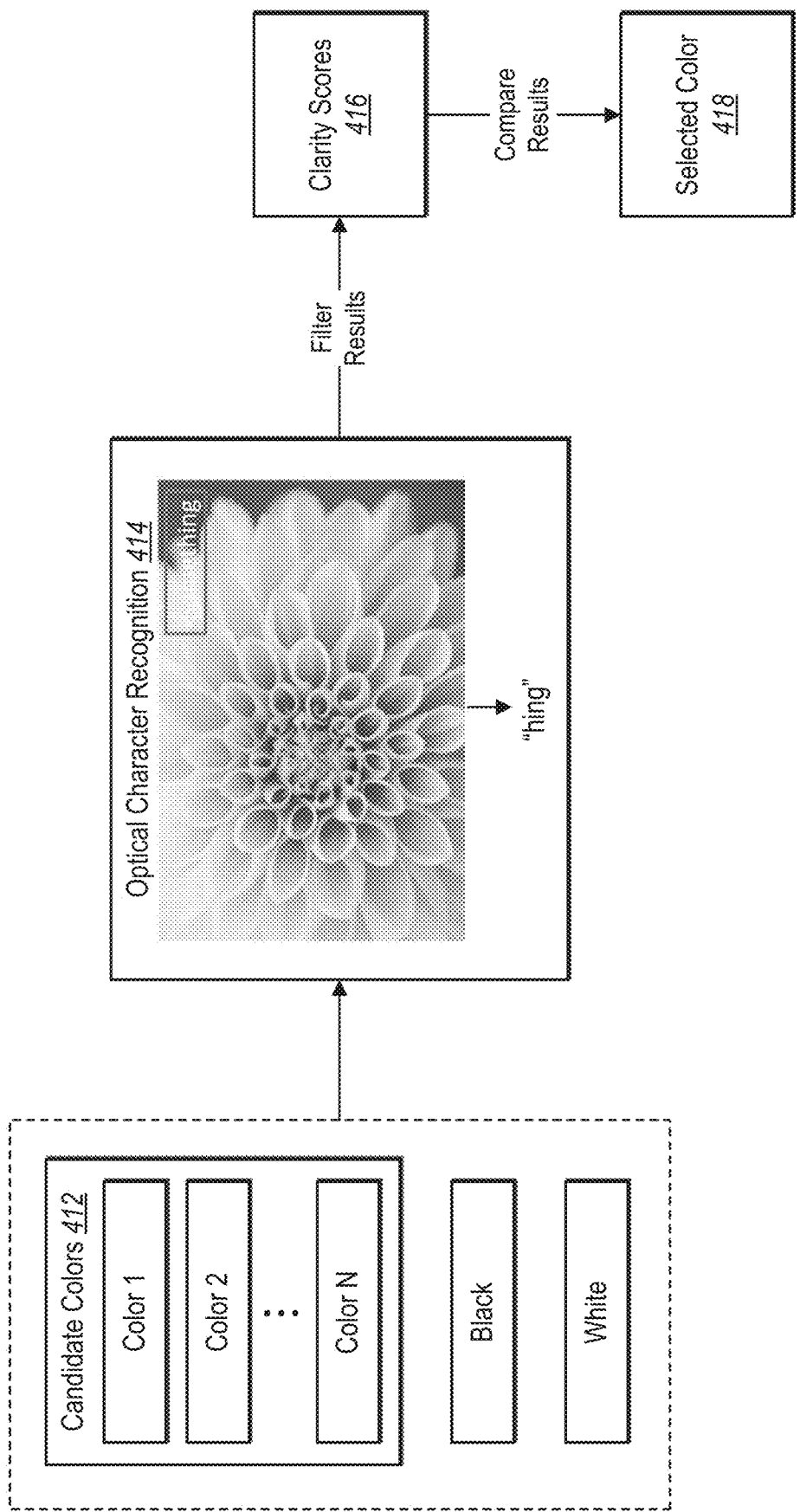
FIG. 4B illustrates an adaptive watermark system selecting a color for a target watermark in accordance with one or more embodiments.

As shown in FIG. 4A, the adaptive watermark system 106 identifies (or receives) the watermark 402 for insertion in a digital image 404, wherein the watermark 402 comprises a text (i.e., the word "Something"). In some embodiments, a user selects a particular font style and/or size for the watermark 402. As illustrated, the adaptive watermark system 106 determines a bounding box 406 corresponding in size to the watermark 402. For example, in the implementation shown, the watermark 402 comprises the text "Something" in a particular font style and font size. As shown, the adaptive watermark system 106 determines the bounding box 406 by tracing the outer bounds of the text of the watermark 402 (see broken lines surrounding the word "Something"). While the implementation shown includes a determination of candidate colors 412 for a text-based watermark (i.e., watermark 402), other implementations include consideration of watermark colors for graphic-based watermarks.

As illustrated, the adaptive watermark system 106 utilizes the bounding box 406 to extract an extracted region 408 of the digital image 404 at a candidate position for watermark placement (e.g., at an anchor point within the digital image 404). In one or more embodiments, the position of the watermark and/or bounding box relative to an anchor point depends on the relative position of the anchor point within the digital image. For example, if the anchor point is located proximate to the right side of a digital image, the adaptive watermark system 106 aligns the right edge of the watermark with the anchor point, such that the watermark extends to the left of the anchor point. Similarly, if the anchor point is located proximate to the left side of a digital image, the adaptive watermark system 106 aligns the left edge of the watermark with the anchor point, such that the watermark extends to the right of the anchor point. Moreover, if the anchor point is located proximate to the longitudinal center side of a digital image, the adaptive watermark system 106 aligns the center of the watermark with the anchor point, such that the watermark extends equally to the left and right of the anchor point.

In response to extracting the extracted region 408, the adaptive watermark system 106 generates a complementary region 410 based on pixel colors of the extracted region 408. More specifically, the adaptive watermark system 106 determines complementary colors for each pixel within the extracted region 408 to generate the complementary region 410, from which the plurality of candidate colors 412 are selected for evaluation as candidate watermark colors. For example, a complementary color can comprise a color with high contrast (e.g., contrast above a threshold) relative to a target color. For instance, a complementary color can include a color proximately opposite a particular target color on a color wheel (e.g., red and green, purple and yellow). For example, in some embodiments, the digital image 406 comprises an RGB image, wherein each image pixel color is expressed by an array of three RGB values (e.g., red expressed as (255, 0, 0)). Accordingly, the adaptive watermark system 106 determines complementary colors for each pixel of the extracted region 408 by subtracting the three RGB values of each pixel from the maximum value supported by the image encoding (i.e., 255 for many RGB images).

In response to determining complementary colors for each pixel, the adaptive watermark system 106 identifies the most dominant complementary colors and selects the candidate colors 412 therefrom. For example, in some embodiments, the adaptive watermark system 106 determines the five most dominant colors using k-means clustering on pixel color-values with k=5. In some embodiments, when the digital image is a monochrome image (i.e., grayscale images), only black and white colors are considered.

Furthermore, FIG. 4B illustrates the adaptive watermark system 106 evaluating the candidate colors 412 to determine the selected color 418 for the watermark 402. As shown, in some embodiments, the adaptive watermark system 106 also considers (i.e., evaluates) black and white with candidate colors 412. As illustrated, the adaptive watermark system 106 positions the watermark 402 at an anchor point in each of the candidate colors 412 (plus black and white), then performs an optical character recognition 414 on the image to determine which, if any, letters of the watermark 402 are readable in each given color when positioned at that particular anchor point. For instance, as shown in FIG. 4B, when the watermark 402 is implemented in white at the upper right corner of the digital image 404, the optical character recognition 414 is only able to read a number of characters (e.g., four text characters, "hing") of the word "Something".

As used herein, the term "optical character recognition" refers to a computer implemented model for extracting characters from digital images. For example, an optical character recognition model or scan can convert typed, handwritten, or printed text (e.g., of a digital image) into machine-encoded text. For example, optical character recognition can include an optical character reader, such as an intelligent character recognition model involving machine learning, intelligent word recognition models, or the like.

In some embodiments, watermark colors resulting in unreadable or partially readable text are filtered (i.e., disqualified as candidate colors) prior to determining clarity scores 416. For example, in instances where one or more of the candidate colors 412 results in a watermark 402 that is readable by optical character recognition 414 in its entirety, those colors that result in unreadable or only partially readable text are disqualified and the one or more colors resulting in fully readable text are further evaluated by the adaptive watermark system 106 to determine clarity scores 416 as described in more detail below (e.g., in relation to FIG. 6). Moreover, in some embodiments, in instances where none of the candidate colors 412 result in a watermark 402 that is fully readable by optical character recognition 414, the adaptive watermark system 106 forgoes filtering by readability to ensure that at least one color is considered for use.

To further illustrate, in some embodiments, the adaptive watermark system 106 determines readability scores for a text-based watermark in a given color by the following equation:

$$\text{readable\_score} = \frac{\text{no. of characters recognized by OCR}}{\text{no. of characters in watermark text}}$$

In other words, in some embodiments, the adaptive watermark system 106 determines a plurality of readability scores corresponding to placement of the watermark 402 in the candidate colors 412 at the given anchor point and selects one or more colors based on the plurality of readability scores. In response, the adaptive watermark system 106 further evaluates the one or more colors to determine the clarity scores 416 and select the selected color 418 based on the clarity scores 416.

As shown in FIG. 4B, the clarity scores 416 are compared to determine the selected color 418 (e.g., by selecting the color having the highest corresponding clarity score). As described in more detail below (e.g., in relation to FIG. 6), in some embodiments the adaptive watermark system determines the clarity scores 416 by combining or averaging contrast ratios between each pixel of the watermark 402 in each candidate color 412 with the underlying pixels of the digital image 404. In some embodiments, when none of the candidate colors 412 and neither black nor white result in fully readable watermarks, the adaptive watermark system 106 selects the watermark color with the most readable characters or, alternatively, determines clarity scores 416 some or all of the watermark colors without filtering the results of the optical character recognition 414.

As mentioned above, in one or more embodiments, the adaptive watermark system 106 determines overlap scores corresponding to placement of a watermark at multiple anchor points within a digital image. For example, FIG. 5 illustrates the adaptive watermark system 106 utilizing a subject mask 504 of a digital image 502 to determine overlap scores 510*a*, 510*b* corresponding to placement of a watermark 506 at anchor points 508*a*, 508*b* within the digital image 502 (in accordance with one or more embodiments).

As used herein, the term "subject mask" refers to a segmentation, boundary, or demarcation indicating a partition of a digital image. In particular, in some embodiments, a subject mask refers to an identification of a portion of an image belonging to an image subject (i.e., an object of interest) and a portion of the image belonging to a background and/or other objects that are not the image subject. For example, in some embodiments, a subject mask includes a map of an image that has an indication for each pixel of whether the pixel corresponds to part of a subject or not. In some implementations, the indication includes a binary indication (e.g., a "1" for pixels belonging to the face and a "0" for pixels not belonging to the ace). In alternative implementations, the indication includes a probability (e.g., a number between 1 and 0) that indicates the likelihood that a pixel belongs to a face. In such implementations, the closer the value is to 1, the more likely the pixel belongs to an object and vice versa.

Figure 5:
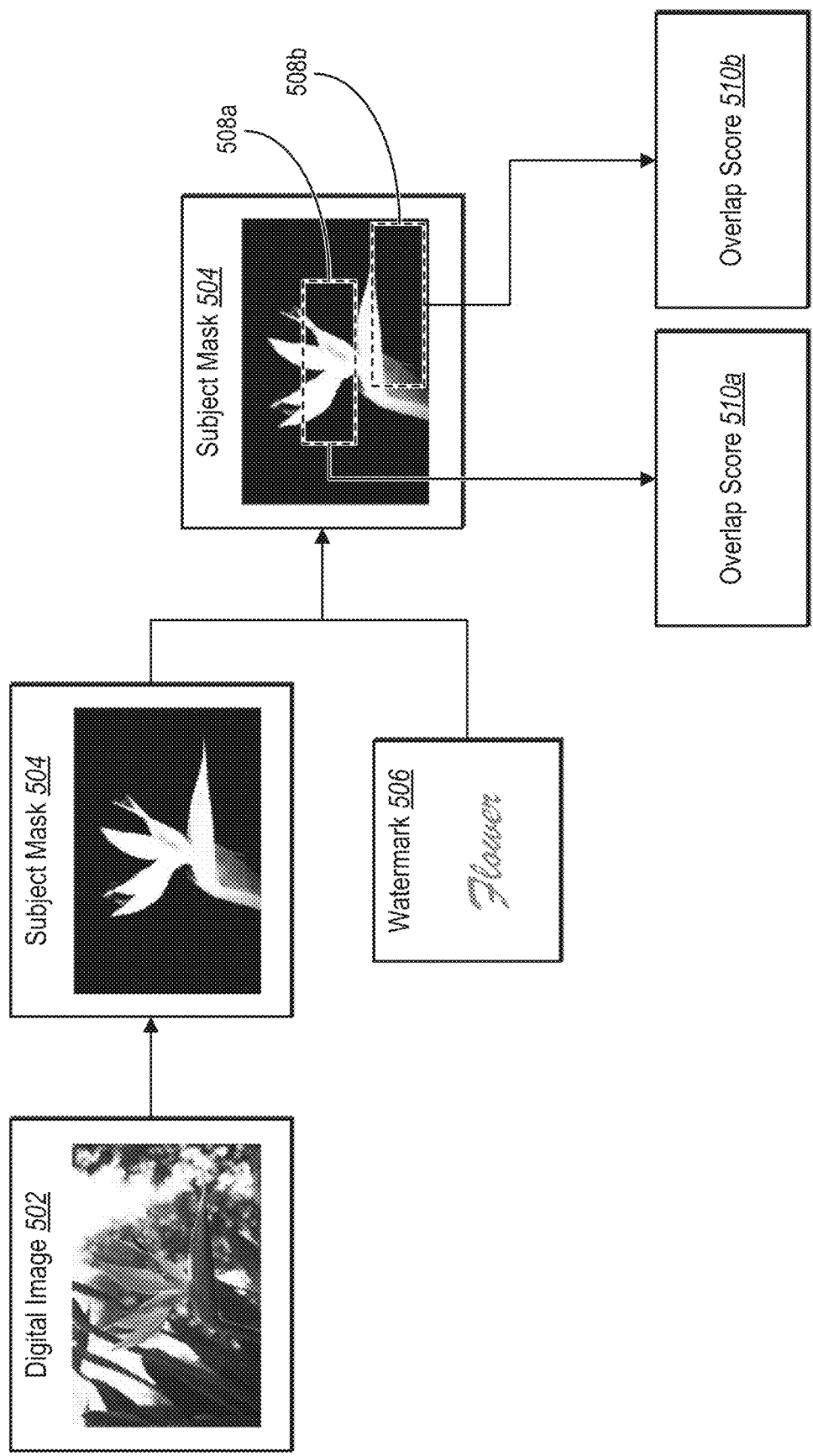
FIG. 5 illustrates an adaptive watermark system determining overlap scores for placement of a target watermark in accordance with one or more embodiments.

As shown in FIG. 5, the adaptive watermark system 106 utilizes the subject mask 504 to indicate a salient region of the digital images 502 or, in other words, a portion of the digital image 502 belonging to an image subject (i.e., in the example shown, a flower in the foreground of the digital image 502). In some embodiments, the adaptive watermark system 106 utilizes an object segmentation model to determine the subject mask 504 indicating a salient region of digital image 502. For example, the object segmentation model can include a convolutional neural network trained to segment digital objects from digital images. For example, in one or more embodiments, the adaptive watermark system 106 utilizes a segmentation model as described in Iteratively Applying Neural Networks to Automatically Identify Pixels of Salient Objects Portrayed in Digital Images, U.S. Pat. No. 11,244,195, issued Feb. 8, 2022, which is incorporated herein by reference. Similarly, in some embodiments, the adaptive watermark system 106 utilizes an object segmentation model as described in Deep Salient Content Neural Networks for Efficient Digital Object Segmentation, U.S. Patent Application Publication No. 2019/0130229, filed Oct. 31, 2017.

To determine the overlap scores 510*a*, 510*b*, the adaptive watermark system 106 overlays the watermark 506 with the subject mask 504 at each respective location 508*a*, 508*b* and determines a measurement of overlap between the watermark 506 and the subject indicated by the subject mask 504. For example, in some embodiments, the overlap scores 510*a*, 510*b* indicate a percentage of pixels of the watermark 506 that overlap with those pixels of the subject mask 504 corresponding to the image subject (i.e., the flower in the foreground of digital image 502) at the respective locations 508*a*, 508*b*. Accordingly, as discussed above, the adaptive watermark system 106 utilizes the overlap scores 510*a*, 510*b* to evaluate placement of the watermark 506 at multiple anchor points or locations 508*a*, 508*b* within the digital image 502.

For example, in some embodiments, the adaptive watermark system 106 determines an overlap score for placement of a watermark at a given anchor point by the following equation:

$$\text{overlap\_score} = \frac{\text{no. of watermark pixels overlapping with salient region}}{\text{total no. of watermark pixels}}$$

As discussed above, in some embodiments, the adaptive watermark system 106 selects an anchor point for placement of a target watermark according to user preferences. In some implementations, the user preferences include a salient region overlap user preference for placement of the target watermark. In other words, a user may indicate a preference either for avoidance of overlap with a salient region (e.g., such as indicated by subject mask 504) or for deliberate overlap with the salient region. Accordingly, the adaptive watermark system 106 determines overlap scores 510*a*, 510*b* to reflect the salient region overlap user preference by, for example, awarding positive values for pixels that overlap or do not overlap with the salient region indicated by the subject mask 504, depending on the user preference.

In one or more embodiments, for example, the adaptive watermark system 106 determines watermark effectiveness scores as a weighted sum of both the overlap score and the clarity score as follows:

$$wm_{score} = w1 * \text{clarity\_score} + w2 * \text{overlap\_score}$$

where w1 and w2 represent weights for the clarity score and the overlap score, respectively. For instance, in some implementations, equal weight is given to the clarity score and the overlap score. Furthermore, to implement a user preference for non-intrusive watermarks (i.e., to avoid overlap with the salient region of the target digital image), the respective weights are set to w1=0.5 and w2=−0.5. Conversely, to implement a user preference for intrusive watermarks (i.e., to deliberately overlap the watermark with the salient region), the respective weights are set to w1=0.5 and w2=0.5.

In or more embodiments, the adaptive watermark system 106 determines these weights. For example, in some implementations, the adaptive watermark system 106 learns these weights (e.g., using a machine learning model such as a linear-regression model). For instance, the adaptive watermark system 106 utilizes feature usage data (e.g., position and color information) to learn weights that approximate preferred watermark configurations.

As mentioned above, in one or more embodiments, the adaptive watermark system 106 determines clarity scores based on contrast ratios between pixels of a given watermark and pixels of a target digital image at multiple anchor points within the target digital image. For example, FIG. 6 illustrates the adaptive watermark system 106 determining contrast ratios 604*a*-604*c* between a given image pixel color 600 and three different watermark pixel colors 602*a*-602*c* to determine respective clarity scores 606*a*-606*c* (in accordance with one or more embodiments).

Figure 6:
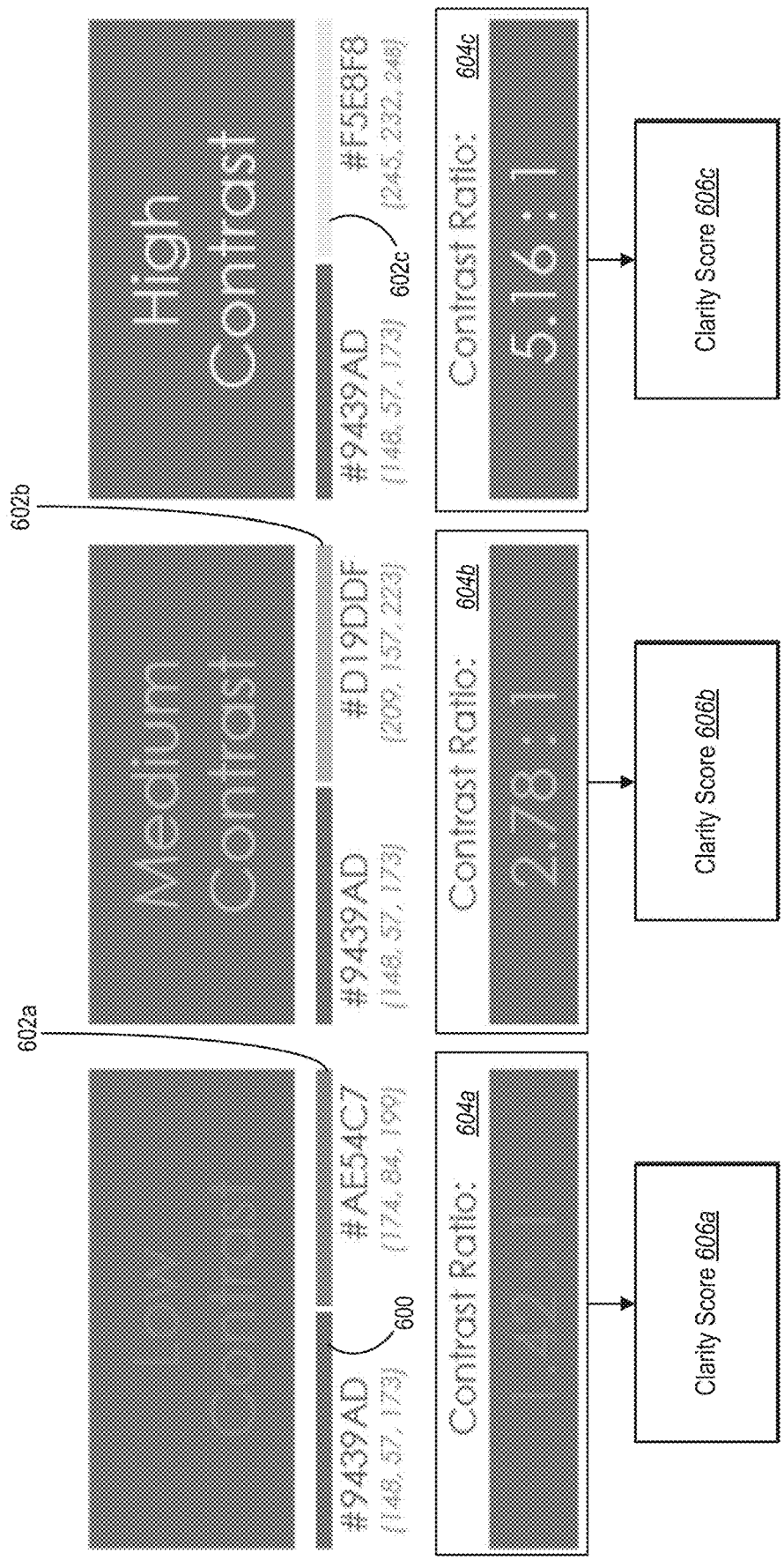
FIG. 6 illustrates an adaptive watermark system determining clarity scores for candidate watermark colors in accordance with one or more embodiments.

As shown in FIG. 6, the adaptive watermark system 106 compares the watermark pixel colors 602*a*-602*c* to determine contrast ratios 604*a*-604*c*. As used herein, the term "contrast ratio" refers to a ratio of the relative luminance of two different colors, which represents a degree to which the two different colors are distinguishable to the human eye. Further, the terms "relative luminance" or "luminance" refer to a calculation of the relative brightness of any point in a color space. For example, the luminance can be normalized to zero for darkest black and one for lightest white, as defined by formulas for the calculation of luminance values for RGB and other color encodings. For instance, comparison of the given image pixel color 600 having an RGB value of (148, 57, 173) with watermark pixel color 602*a* having an RGB value of (174, 84, 199) results in a relatively low contrast ratio 604*a* of 1.42 to 1. Further, comparison of the given image pixel color 600 with watermark pixel color 602*b* having an RGB value of (209, 157, 223) results in a relatively medium contrast 604*b* of 2.78 to 1. Also, comparison of the given image pixel color 600 with watermark pixel color 602*c* having an RGB value of (245, 232, 248) results in a relatively high contrast ratio 604*c* of 5.16 to 1.

For example, in some embodiments, the adaptive watermark system 106 determines a contrast ratio between a given watermark pixel color and a given background pixel (i.e., underlying pixel of a target digital image) color by the following set of equations:

$$lightColorLuminance = \max(luminance_{watermarkPixel}, luminance_{backgroundPixel})$$

$$darkColorLuminance = \min(luminance_{watermarkPixel}, luminance_{backgroundPixel})$$

$$\text{contrast\_ratio} = \frac{lightColorLuminance + 0.05}{darkColorLuminance + 0.05}$$

As shown in FIG. 6, the adaptive watermark system 106 determines clarity scores 606*a*-606*c* based on the contrast ratios 604*a*-604*c*. For example, in some embodiments, the adaptive watermark system 106 positions a given watermark at a given anchor point and compare and determines contrast ratios between each pixel color of a given watermark with each underlying pixel of a target digital image. The adaptive watermark system 106 then determines a clarity score for placement of the given watermark at the given anchor point based on a combination or an average of the contrast ratios. Accordingly, a watermark configuration having a higher average of contrast ratios relative to the underlying image results in a higher clarity score.

In some embodiments, the adaptive watermark system 106 determines a number of pixels with contrast ratios that satisfy a threshold ratio. The adaptive watermark system 106 determines a clarity score based on a ratio of the number of pixels that satisfy the threshold ratio and the number of pixels in the watermark. For example, in some embodiments, the adaptive watermark system 106 determines a clarity score for placement of a given watermark at a given anchor point within a target digital image by the following equation:

$$\text{clarity\_score} = \frac{\text{no. of pixels with contrast\_ratio} > 4.5}{\text{total no. of watermark pixels}}$$

As indicated in the above equation, in some embodiments, the adaptive watermark system 106 determines clarity scores by counting the number of watermark pixels that result in a contrast ratio of 4.5 or greater. Alternatively, embodiments of the adaptive watermark system 106 can utilize a different contrast ratio or, as described above, can determine clarity scores by averaging the contrast ratios of every watermark pixel to determine an average contrast ratio.

Figure 7:
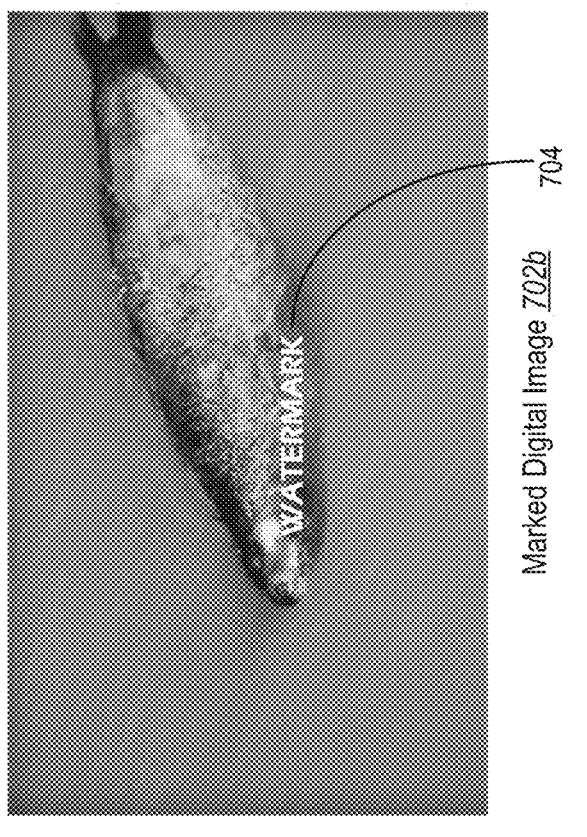
FIG. 7 illustrates experimental results of an adaptive watermark system generating marked digital images according to user preferences for salient region overlap in accordance with one or more embodiments.
Figure 7:
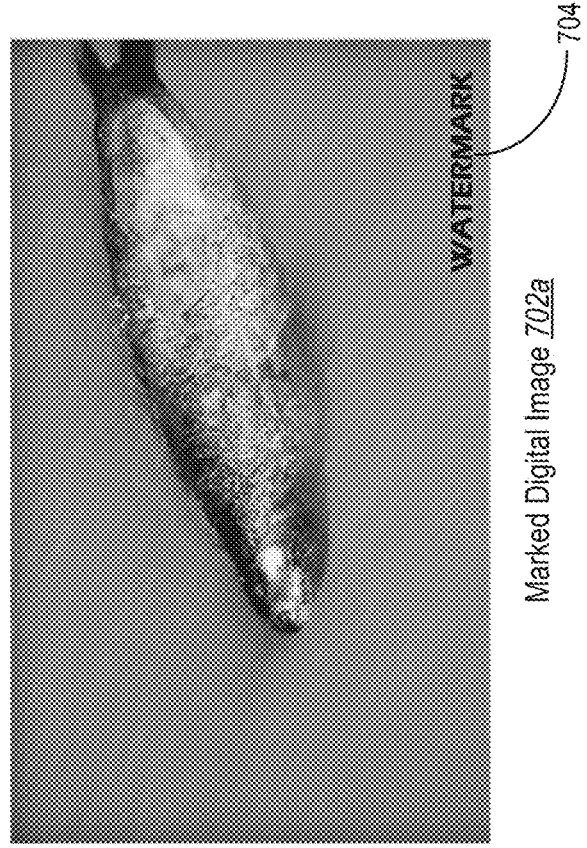
Figure 8A:
FIG. 8A illustrates experimental results of an adaptive watermark system generating marked digital images with a text-based watermark in accordance with one or more embodiments.
Figure 8A:
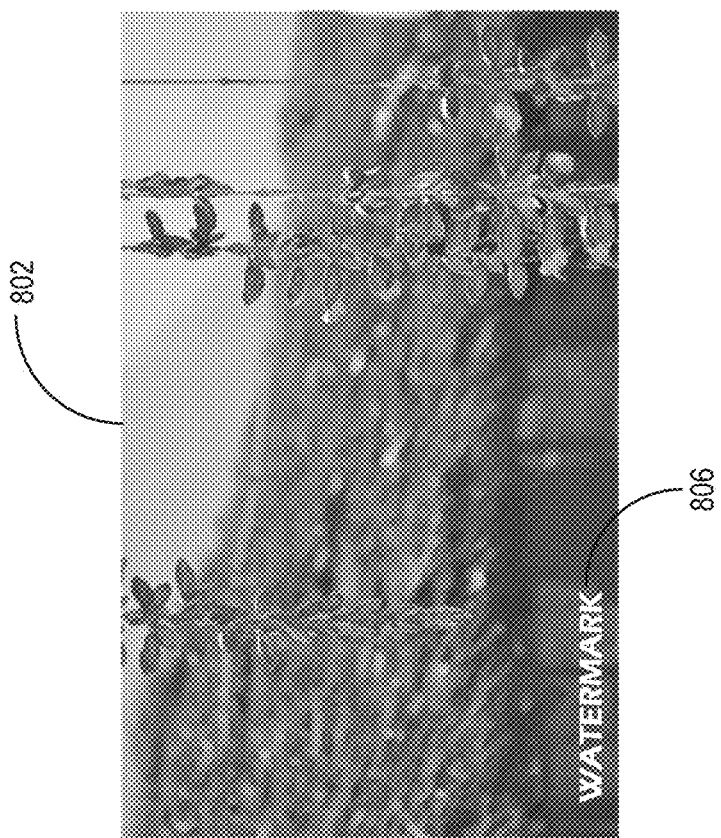
Figure 8B:
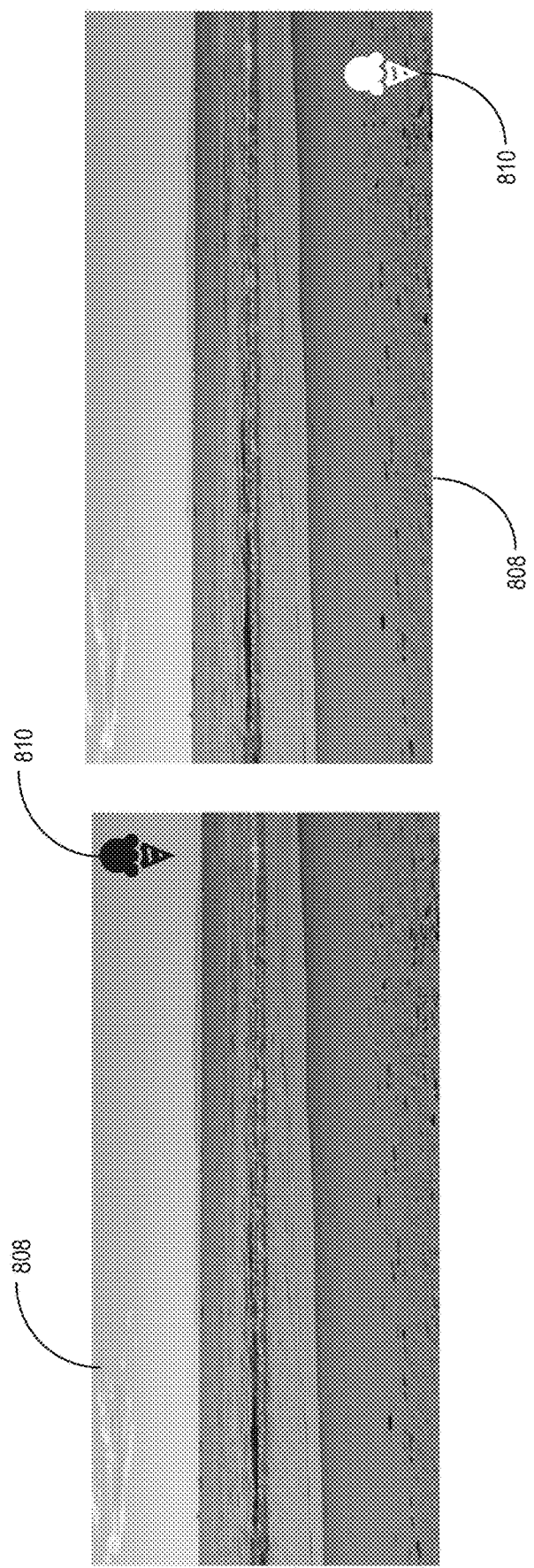
FIG. 8B illustrates experimental results of an adaptive watermark system generating marked digital images with a graphic-based watermark in accordance with one or more embodiments.

As discussed above, the adaptive watermark system 106 provides a variety of technical advantages in generating marked digital images with content adaptive watermarks. For example, FIGS. 7, and 8A-8B show experimental results of example embodiments of the adaptive watermark system 106 generating marked digital images with watermarks configured with respect to content of target digital images and according to user preferences. For instance, FIG. 7 shows results of generating marked digital images 702*a*, 702*b* having a watermark configured according to a user preference for salient region overlap (e.g., overlap with a subject of the target digital image).

As shown in FIG. 7, the marked digital image 702*a* comprises a watermark 704 (i.e., the stylized word "WATERMARK") positioned in accordance with a user preference for avoiding overlap with the salient region or subject (i.e., the depicted seal) of the target digital image. Also, the marked digital image 702*a* includes the watermark 704 in a dark color to provide contrast with the underlying image at the selected position. In contrast, the marked digital image 702*b* comprises the watermark 704 positioned in accordance with a user preference for deliberate overlap with the salient region or subject (e.g., to prevent unauthorized copying of the marked digital image 702*b*). Also, the marked digital image 702*n* includes the watermark 704 in a lighter color to provide additional contrast with the underlying image at the selected position. Indeed, as shown in FIG. 7, the adaptive watermark system 106 accurately and flexible generates marked digital images with content adaptive watermarks according to the preferences of a user.

Relatedly, FIGS. 8A-8B show results of an example implementation of the adaptive watermark system 106 generating multiple marked digital images having content adaptive configurations of a given watermark. For example, FIG. 8A shows a watermark 806 positioned at different relative locations with digital images 802 and 804. In particular, the adaptive watermark system 106 positions the watermark 806 relative to the content of respective digital images 802 and 804, such that the watermark 806 does not overlap with the vines in the foreground of digital image 802 or the flower in the foreground of digital image 804. Indeed, as shown in FIG. 8A, the adaptive watermark system 106 accurately and efficiently generates multiple marked digital images having content adaptive configurations of the target watermark 806.

Moreover, FIG. 8B shows graphic-based watermark 812 adaptively configured with different colors at different locations of a target digital image 808. For instance, the watermark 810 is configured with a dark color when placed in the upper right corner of the target digital image 808 to provide increased contrast with the depicted sky, whereas the watermark 810 is configured with a light color when placed in the lower right corner of the target digital image 808 to provide increased contrast with the depicted sand. Indeed, as shown in FIG. 8B, the adaptive watermark system 106 accurately selects content adaptive watermark configurations for placement of the watermark 810 within the target digital image 808.

Figure 9:
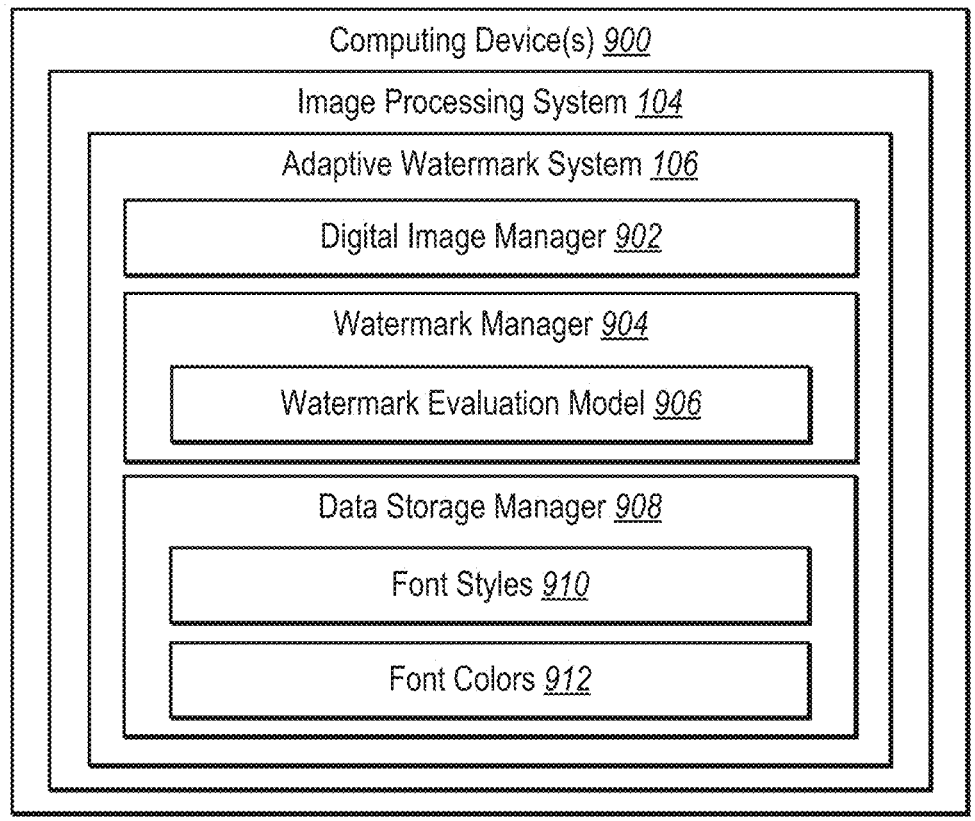
FIG. 9 illustrates a schematic diagram of an adaptive watermark system in accordance with one or more embodiments.

Turning now to FIG. 9, additional detail will be provided regarding components and capabilities of one or more embodiments of the adaptive watermark system 106. In particular, FIG. 9 illustrates an example adaptive watermark system 106 executed by a computing device 900 (e.g., the server devices(s) 102 or the client device 110). As shown by the embodiment of FIG. 9, the computing device 900 includes or hosts the image processing system 104 and/or the adaptive watermark system 106. Furthermore, as shown in FIG. 9, the adaptive watermark system 106 includes a digital image manager 902, a watermark manager 904, and a data storage manager 908.

As just mentioned, and as illustrated in the embodiment of FIG. 9, the adaptive watermark system 106 includes the digital image manager 902. For instance, the digital image manager 902 identifies, stores, transmits, and/or displays digital images as described above (e.g., in relation to FIGS. 1-3). Furthermore, as shown in FIG. 9, the adaptive watermark system 106 includes the watermark manager 904. For instance, the watermark manager 904 manages the various content adaptive watermark models described herein, such as a watermark evaluation model 906 (e.g., as described above in relation to FIGS. 1-3). In some instances, the watermark manager 904 also identifies, stores, transmits, and/or displays watermark images (e.g., graphics, icons, logos, etc.).

As also shown in FIG. 9, the adaptive watermark system 106 includes the data storage manager 908. In some embodiments, the data storage manager 908 is implemented by one or more memory devices. Additionally, in certain instances, the data storage manager 908 maintains data to perform one or more functions of the adaptive watermark system 106. For example, the data storage manager 908 includes digital images, watermarks, font styles 910, and/or font colors 912.

Each of the components 902-912 of the adaptive watermark system 106 can include software, hardware, or both. For example, the components 902-912 can include one or more instructions stored on a computer-readable storage medium and executable by processors of one or more computing devices, such as a client device or server device. When executed by the one or more processors, the computer-executable instructions of the adaptive watermark system 106 can cause the computing device(s) 900 to perform the methods described herein. Alternatively, the components 902-912 can include hardware, such as a special-purpose processing device to perform a certain function or group of functions. Alternatively, the components 902-

912 of the adaptive watermark system 106 can include a combination of computer-executable instructions and hardware.

Furthermore, the components 902-912 of the adaptive watermark system 106 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 902-912 may be implemented as a stand-alone application, such as a desktop or mobile application. Furthermore, the components 902-912 may be implemented as one or more web-based applications hosted on a remote server. The components 902-912 may also be implemented in a suite of mobile device applications or "apps." To illustrate, the components 902-912 may be implemented in an application, including but not limited to, ADOBE PHOTOSHOP, ADOBE PREMIERE, ADOBE BRIDGE, ADOBE LIGHTROOM, ADOBE ILLUSTRATOR, ADOBE SUBSTANCE, ADOBE CREATIVE CLOUD, or ADOBE STOCK. The foregoing are either registered trademarks or trademarks of Adobe Systems Incorporated in the United States and/or other countries.

Figure 10:
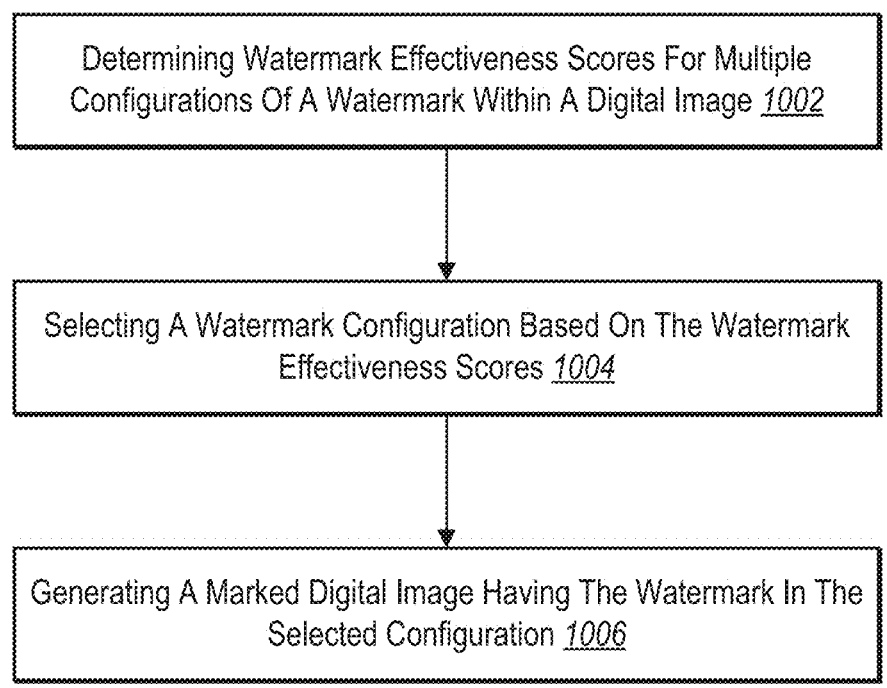
FIG. 10 illustrates a flowchart of a series of acts for generating marked digital images in accordance with one or more embodiments.

FIGS. 1-9, the corresponding text, and the examples provide a number of different methods, systems, devices, and non-transitory computer-readable media of the adaptive watermark system 106. In addition to the foregoing, one or more embodiments can also be described in terms of flowcharts comprising acts for accomplishing a particular result, as shown in FIG. 10. The acts shown in FIG. 10 may be performed with more or fewer acts. Further, the acts may be performed in differing orders. Additionally, the acts described herein may be repeated or performed in parallel with one another or parallel with different instances of the same or similar acts.

As mentioned, FIG. 10 illustrates a flowchart of a series of acts 1000 for generating marked digital images with content adaptive watermarks in accordance with one or more embodiments. While FIG. 10 illustrates acts according to one embodiment, alternative embodiments may omit, add to, reorder, and/or modify any of the acts shown in FIG. 10. The acts of FIG. 10 can be performed as part of a computer-implemented method. Alternatively, a non-transitory computer-readable medium can comprise instructions that, when executed by one or more processors, cause a computing device to perform the acts of FIG. 10. In some embodiments, a system can perform the acts of FIG. 10.

As shown in FIG. 10, the series of acts 1000 includes an act 1002 of determining watermark effectiveness scores for multiple configurations of a watermark within a digital image. For instance, in one or more embodiments, the act 1002 includes determining, for a target watermark, a plurality of watermark effectiveness scores corresponding to placement of the target watermark at a plurality of anchor points of a target digital image. Also, in some embodiments, the act 1002 includes determining a plurality of overlap scores and a plurality of clarity scores corresponding to placement of the target watermark at the plurality of anchor points of the target digital image and combining the plurality of overlap scores and the plurality of clarity scores to determine the plurality of watermark effectiveness scores. Further, in one or more embodiments, the act 1002 includes determining a salient region of the target digital image utilizing an object segmentation model and determining, for an anchor point of the plurality of anchor points, an overlap score by determining a measure of overlap between the salient region and the target watermark positioned at the anchor point.

Moreover, in some embodiments, the act 1002 includes determining a plurality of contrast ratios between pixel colors of the target digital image and the target watermark positioned at the plurality of anchor points. Also, in one or more embodiments, the act 1002 includes determining luminance values for the pixel colors of the target digital image at the plurality of anchor points and for the target watermark and comparing the luminance values of the target digital image at the plurality of anchor points with the luminance values of the target watermark to determine the plurality of contrast ratios. In addition, in some embodiments, the act 1002 includes determining a plurality of complementary colors based on a plurality of pixel colors of the target digital image proximate to an anchor point of the plurality of anchor points and determining a plurality of readability scores corresponding to placement of the target watermark in the plurality of complementary colors at the anchor point.

Further, in one or more embodiments, the act 1002 includes: receiving, via a client device, a user selection of a first target digital image, a second target digital image, and a target watermark; determining, for the first target digital image, a first plurality of watermark effectiveness scores corresponding to a first plurality of anchor points of the first target digital image; and determining, for the second target digital image, a second plurality of watermark effectiveness scores corresponding to a second plurality of anchor points of the second target digital image. Also, in some embodiments, the act 1002 includes determining the first plurality of watermark effectiveness scores by comparing pixels of first digital image with overlapping pixels of the target watermark at the first plurality of anchor points and determining the second plurality of watermark effectiveness scores by comparing pixels of second digital image with overlapping pixels of the target watermark at the second plurality of anchor points.

In addition, in some embodiments, the act 1002 includes determining readability scores for a plurality of complementary colors based on a number of text characters of the target watermark detected by an optical character recognition (OCR) scan of the first target digital image (and/or a second digital image). Also, in some embodiments, the act 1002 includes determining a salient region of the first target digital image utilizing an object segmentation model and determining, for an anchor point of the first plurality of anchor points, an overlap score by determining a measure of overlap between the salient region and the target watermark positioned at the anchor point.

Moreover, in one or more embodiments, the act 1002 includes determining a plurality of clarity scores based on contrast ratios between pixel colors of the target watermark and the target digital image at the plurality of anchor points, determining a plurality of overlap scores based on a measure of overlap between pixels of the target watermark and the target digital image at the plurality of anchor points, and combining the plurality of clarity scores and the plurality of overlap scores to determine the plurality of watermark effectiveness scores. Further, in some embodiments, the act 1002 includes determining a plurality of complementary color sets based on one or more pixel colors of the target digital image proximate the plurality of anchor points and determining a plurality of clarity scores for the plurality of complementary color sets, based on contrast ratios between the plurality of complementary color sets and the one or more pixel colors at the plurality of anchor points. In addition, in some embodiments, the act 1002 includes extracting, at the plurality of anchor points, a plurality of watermark regions corresponding in size to the target watermark and determining the plurality of complementary color sets based on one or more pixel colors within the plurality of watermark regions.

As shown in FIG. 10, the series of acts 1000 includes an act 1004 of selecting a watermark configuration based on the watermark effectiveness scores. For example, in some embodiments, the act 1004 includes selecting an anchor point from the plurality of anchor points utilizing the plurality of watermark effectiveness scores. Additionally, in some embodiments, the act 1004 includes receiving, via a client device, a salient region overlap user preference for placement of the target watermark and selecting, in response to receiving the user preference, the anchor point from the plurality of anchor points by comparing overlap scores for the plurality of anchor points in light of the user preference. Further, in some embodiments, the act 1004 includes selecting, from a plurality of complementary colors, a watermark color for placement of the target watermark at the anchor point based on a plurality of readability scores. In addition, in one or more embodiments, the act 1004 includes selecting an additional anchor point from an additional plurality of anchor points of an additional target digital image for placement of the target watermark at the selected additional anchor point.

Further, in one or more embodiments, the act 1004 includes determining a first color for the target watermark based on one or more colors of the first target digital image and determining a second color for the target watermark based on one or more colors of the second target digital image. Moreover, in some embodiments, the act 1004 includes selecting the first color from a first plurality of complementary text colors based on contrast ratios between the first plurality of complementary text colors and one or more colors of the first target digital image at the first plurality of anchor points and selecting the second color from a second plurality of complementary text colors based on contrast ratios between the second plurality of complementary text colors and one or more colors of the second target digital image at the second plurality of anchor points. In addition, in some embodiments, the act 1004 includes selecting the first color and/or the second color based on first and/or second pluralities of readability scores.

Moreover, in some embodiments, the act 1004 includes selecting, from a plurality of complementary color sets, a plurality of candidate watermark colors corresponding to placement of the target watermark at a plurality of anchor points, based on a plurality of clarity scores. Also, in some embodiments, the act 1004 includes determining a plurality of readability scores for the plurality of complementary color sets based on a number of text characters detected by an optical character recognition (OCR) scan and selecting the plurality of candidate watermark colors based on the plurality of clarity scores and the plurality of readability scores. Further, in one or more embodiments, the act 1002 includes determining the plurality of watermark effectiveness scores corresponding to placement of the target watermark in the plurality of candidate watermark colors at the plurality of anchor points.

As shown in FIG. 10, the series of acts 1000 includes an act 1006 of generating a marked digital image having the watermark in the selected configuration. For instance, in one or more embodiments, the act 1006 includes generating a marked digital image by adding the target watermark to the target digital image at the selected anchor point. Further, in one or more embodiments, the act 1006 includes generating a plurality of marked digital images by adding the target watermark to a first anchor point of a first target digital image and a second anchor point of a second target digital image utilizing a first plurality of watermark effectiveness scores and a second plurality of watermark effectiveness scores. Moreover, in some embodiments, the act 1006 includes generating the marked digital image by adding the target watermark to the target digital image at the selected anchor point in a watermark color of the plurality of candidate watermark colors corresponding to the selected anchor point.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
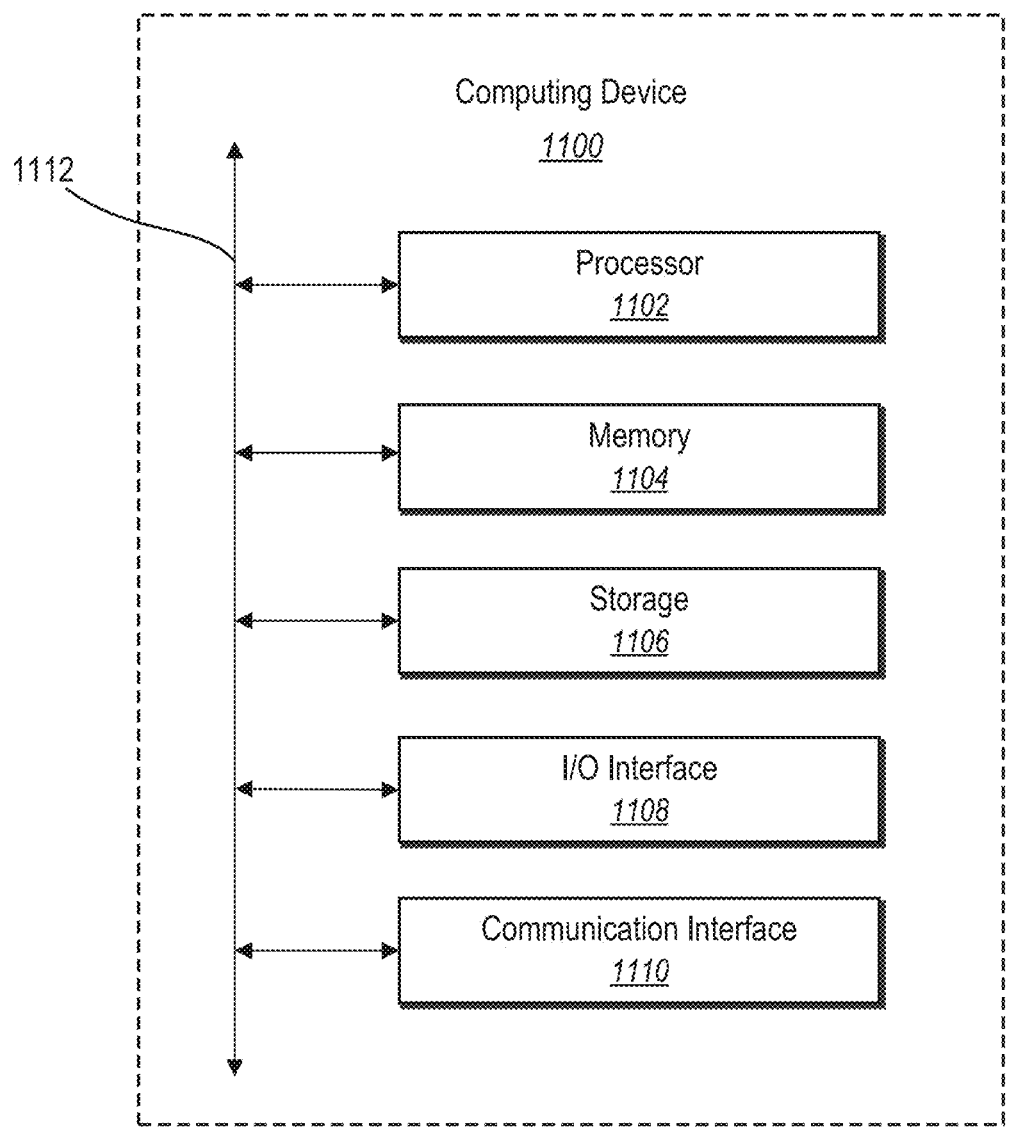
FIG. 11 illustrates a block diagram of an example computing device for implementing one or more embodiments of the present disclosure.

FIG. 11 illustrates a block diagram of an example computing device 1100 that may be configured to perform one or more of the processes described above. One will appreciate that one or more computing devices, such as the computing device 1100 may represent the computing devices described above (e.g., computing device 900, server device(s) 102, and client device 110). In one or more embodiments, the computing device 1100 may be a mobile device (e.g., a mobile telephone, a smartphone, a PDA, a tablet, a laptop, a camera, a tracker, a watch, a wearable device, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing executable instructions, which when executed by at least one processor, cause the at least one processor to perform operations comprising:
    determining, for a target watermark, a plurality of watermark effectiveness scores corresponding to placement of the target watermark at a plurality of anchor points of a target digital image;
    selecting an anchor point from the plurality of anchor points utilizing the plurality of watermark effectiveness scores; and
    generating a marked digital image by adding the target watermark to the target digital image at the selected anchor point.

2. The non-transitory computer-readable medium of claim 1, wherein determining the plurality of watermark effectiveness scores comprises:
    determining a plurality of overlap scores and a plurality of clarity scores corresponding to placement of the target watermark at the plurality of anchor points of the target digital image; and
    combining the plurality of overlap scores and the plurality of clarity scores to determine the plurality of watermark effectiveness scores.

3. The non-transitory computer-readable medium of claim 1, wherein determining the plurality of watermark effectiveness scores comprises:
    determining a salient region of the target digital image utilizing an object segmentation model; and
    determining, for an anchor point of the plurality of anchor points, an overlap score by determining a measure of overlap between the salient region and the target watermark positioned at the anchor point.

4. The non-transitory computer-readable medium of claim 3, further comprising instructions that, when executed by the at least one processor, cause the at least one processor to perform operations comprising:
    receiving, via a client device, a salient region overlap user preference for placement of the target watermark; and
    selecting, in response to receiving the user preference, the anchor point from the plurality of anchor points by comparing overlap scores for the plurality of anchor points in light of the user preference.

5. The non-transitory computer-readable medium of claim 1, wherein determining the plurality of watermark effectiveness scores comprises determining a plurality of contrast ratios between pixel colors of the target digital image and the target watermark positioned at the plurality of anchor points.

6. The non-transitory computer-readable medium of claim 5, wherein determining the plurality of contrast ratios comprises:
    determining luminance values for the pixel colors of the target digital image at the plurality of anchor points and for the target watermark; and
    comparing the luminance values of the target digital image at the plurality of anchor points with the luminance values of the target watermark to determine the plurality of contrast ratios.

7. The non-transitory computer-readable medium of claim 5, wherein determining the plurality of contrast ratios comprises:
    determining a plurality of complementary colors based on a plurality of pixel colors of the target digital image proximate to an anchor point of the plurality of anchor points;
    determining a plurality of readability scores corresponding to placement of the target watermark in the plurality of complementary colors at the anchor point; and
    selecting, from the plurality of complementary colors, a watermark color for placement of the target watermark at the anchor point based on the plurality of readability scores.

8. The non-transitory computer-readable medium of claim 1, instructions that, when executed by the at least one processor, cause the at least one processor perform operations comprising selecting an additional anchor point from an additional plurality of anchor points of an additional target digital image for placement of the target watermark at the selected additional anchor point.

9. A system comprising:
    one or more memory devices; and
    one or more processors coupled to the one or more memory devices that cause the system to perform operations comprising:

receiving, via a client device, a user selection of a first target digital image, a second target digital image, and a target watermark;

determining, for the first target digital image, a first plurality of watermark effectiveness scores corresponding to a first plurality of anchor points of the first target digital image;

determining, for the second target digital image, a second plurality of watermark effectiveness scores corresponding to a second plurality of anchor points of the second target digital image; and generating a plurality of marked digital images by adding the target watermark to a first anchor point of the first target digital image and a second anchor point of the second target digital image utilizing the first plurality of watermark effectiveness scores and the second plurality of watermark effectiveness scores.

10. The system of claim 9, wherein the one or more processors are further configured to cause the system to perform operations comprising:

determining the first plurality of watermark effectiveness scores by comparing pixels of first digital image with overlapping pixels of the target watermark at the first plurality of anchor points; and determining the second plurality of watermark effectiveness scores by comparing pixels of second digital image with overlapping pixels of the target watermark at the second plurality of anchor points.

11. The system of claim 9, wherein the one or more processors are further configured to cause the system to perform operations comprising:

determining a first color for the target watermark based on one or more colors of the first target digital image; and determining a second color for the target watermark based on one or more colors of the second target digital image.

12. The system of claim 11, wherein determining the first and second colors further comprises:

selecting the first color from a first plurality of complementary text colors based on contrast ratios between the first plurality of complementary text colors and one or more colors of the first target digital image at the first plurality of anchor points; and selecting the second color from a second plurality of complementary text colors based on contrast ratios between the second plurality of complementary text colors and one or more colors of the second target digital image at the second plurality of anchor points.

13. The system of claim 11, wherein determining the first color further comprises:

determining readability scores for a plurality of complementary colors based on a number of text characters of the target watermark detected by an optical character recognition (OCR) scan of the first target digital image; and selecting the first color based on the plurality of readability scores.

14. The system of claim 9, wherein determining the first plurality of watermark effectiveness scores comprises:

determining a salient region of the first target digital image utilizing an object segmentation model; and determining, for an anchor point of the first plurality of anchor points, an overlap score by determining a measure of overlap between the salient region and the target watermark positioned at the anchor point.

15. A computer-implemented method comprising:

determining, for a target watermark, a plurality of watermark effectiveness scores corresponding to placement of the target watermark at a plurality of anchor points of a target digital image;

selecting an anchor point from the plurality of anchor points utilizing the plurality of watermark effectiveness scores; and generating a marked digital image by adding the target watermark to the target digital image at the selected anchor point.

16. The computer-implemented method of claim 15, wherein determining the plurality of watermark effectiveness scores comprises:

determining a plurality of clarity scores based on contrast ratios between pixel colors of the target watermark and the target digital image at the plurality of anchor points;

determining a plurality of overlap scores based on a measure of overlap between pixels of the target watermark and the target digital image at the plurality of anchor points; and combining the plurality of clarity scores and the plurality of overlap scores to determine the plurality of watermark effectiveness scores.

17. The computer-implemented method of claim 15, further comprising:

determining a plurality of complementary color sets based on one or more pixel colors of the target digital image proximate the plurality of anchor points;

determining a plurality of clarity scores for the plurality of complementary color sets, based on contrast ratios between the plurality of complementary color sets and the one or more pixel colors at the plurality of anchor points; and selecting, from the plurality of complementary color sets, a plurality of candidate watermark colors corresponding to placement of the target watermark at the plurality of anchor points, based on the plurality of clarity scores.

18. The computer-implemented method of claim 17, further comprising:

extracting, at the plurality of anchor points, a plurality of watermark regions corresponding in size to the target watermark; and determining the plurality of complementary color sets based on one or more pixel colors within the plurality of watermark regions.

19. The computer-implemented method of claim 17, further comprising:

determining a plurality of readability scores for the plurality of complementary color sets based on a number of text characters detected by an optical character recognition (OCR) scan; and selecting the plurality of candidate watermark colors based on the plurality of clarity scores and the plurality of readability scores.

20. The computer implemented method of claim 19, further comprising:

determining the plurality of watermark effectiveness scores corresponding to placement of the target watermark in the plurality of candidate watermark colors at the plurality of anchor points; and generating the marked digital image by adding the target watermark to the target digital image at the selected anchor point in a watermark color of the plurality of candidate watermark colors corresponding to the selected anchor point.

* * * * *